May 21, 1968  S. M. HUTCHINSON ET AL  3,383,777
FILM DRYER FOR SINGLE SHEET FILM
Filed June 21, 1966  3 Sheets-Sheet 3
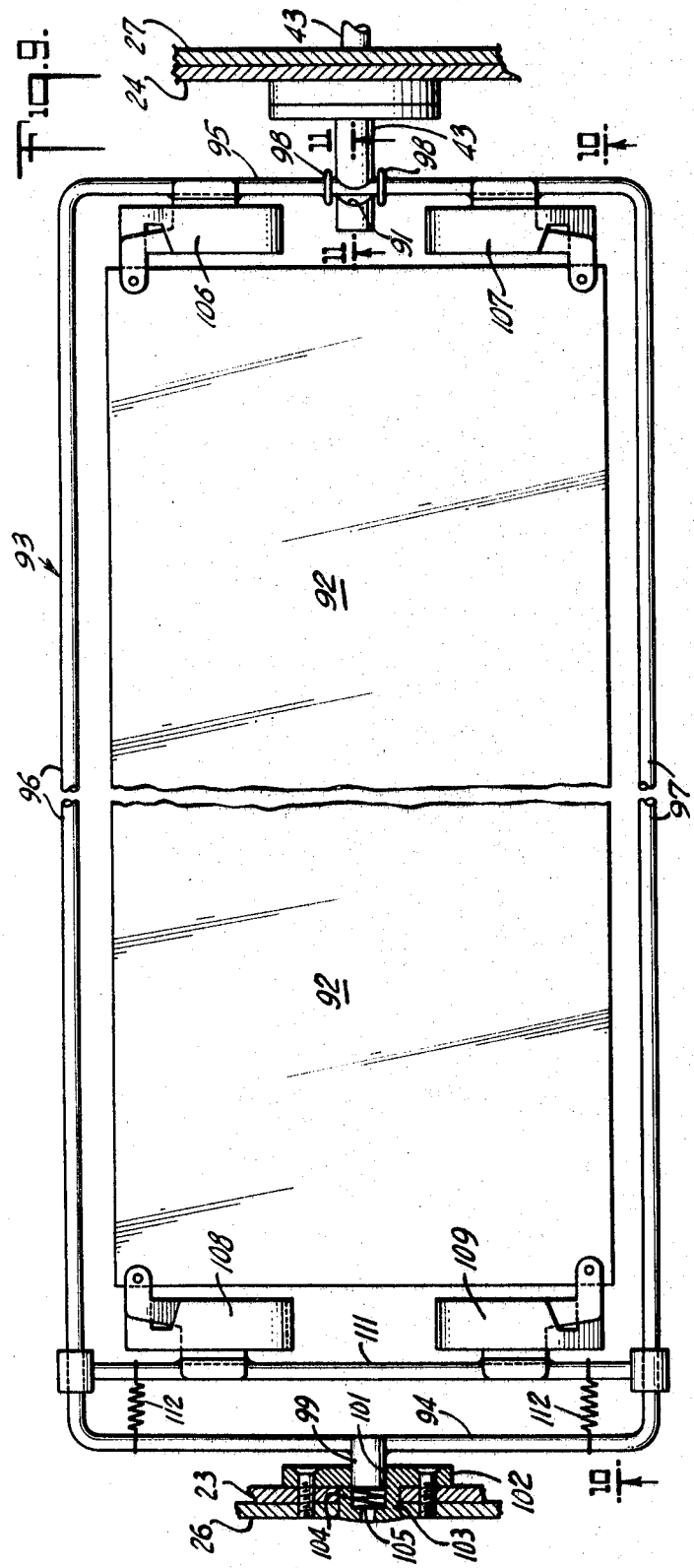
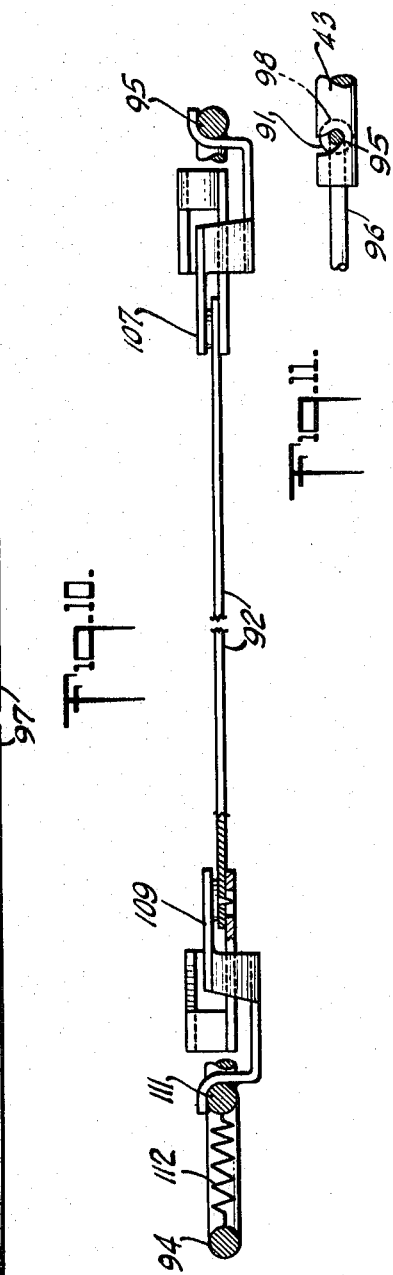
INVENTORS:
SEYMOUR M. HUTCHINSON
FRANZ KRAUSE
BY
A. Jordan Kurick
ATTORNEY United States Patent Office 3,383,777
Patented May 21, 1968

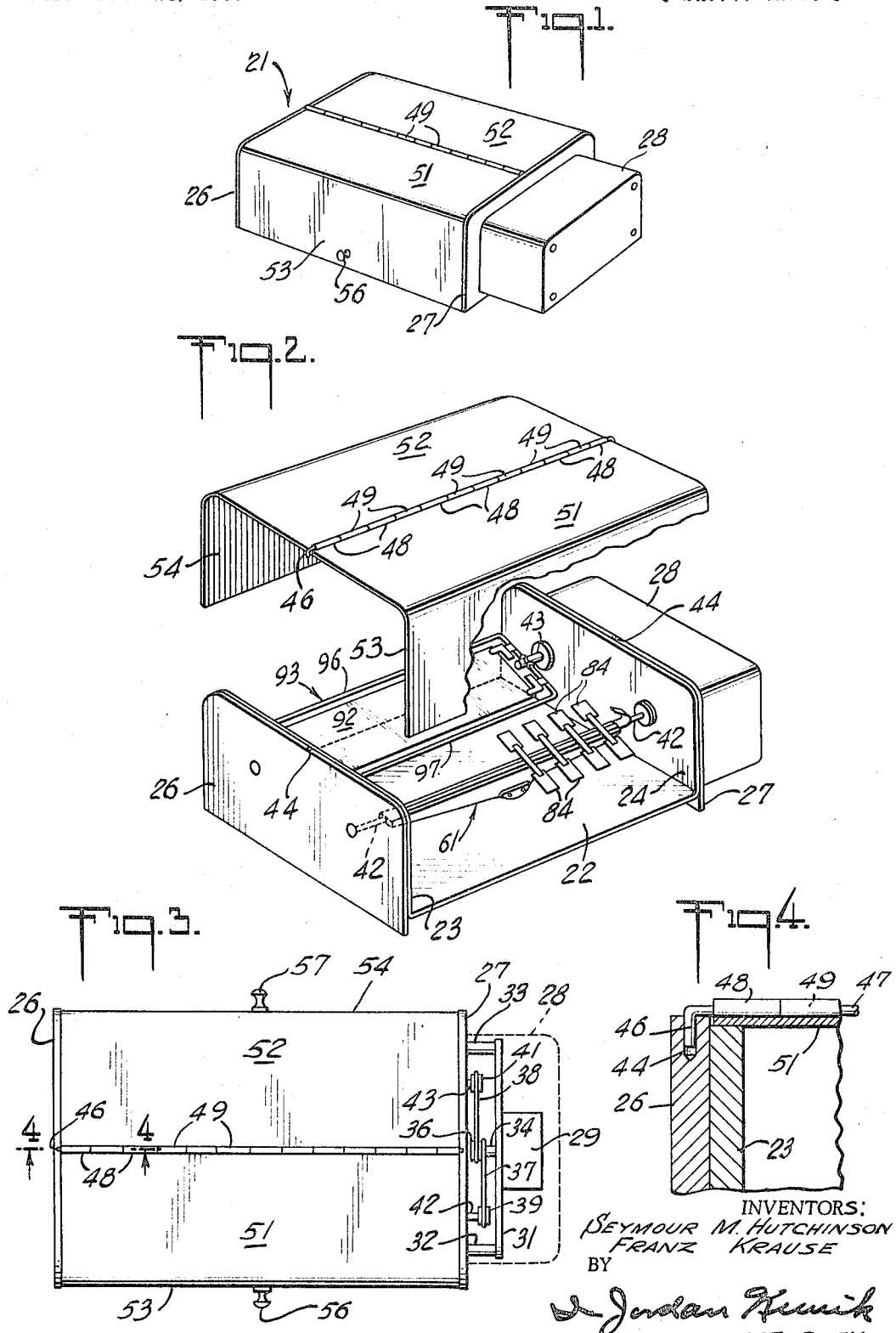

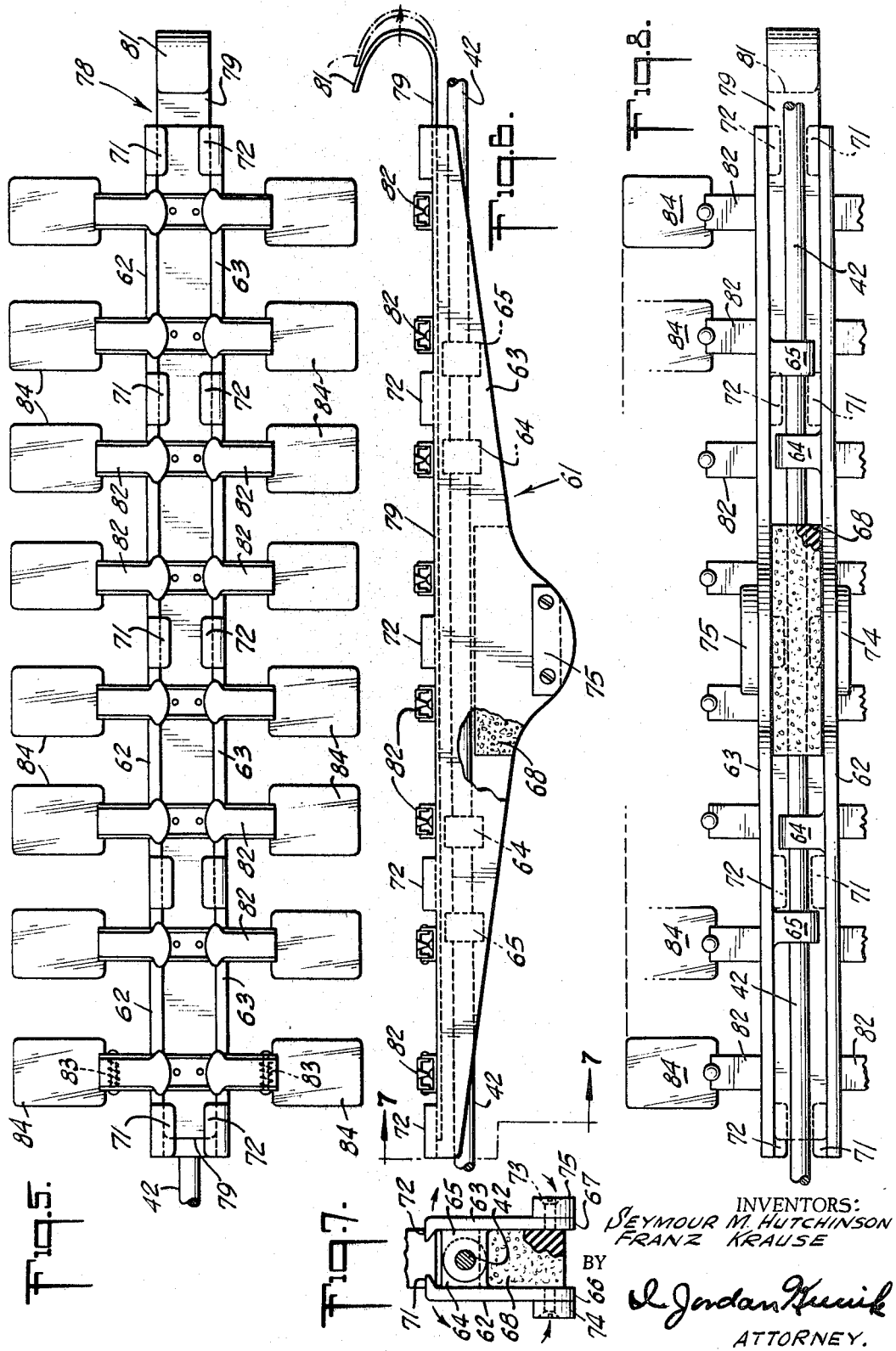

3,383,777
FILM DRYER FOR SINGLE SHEET FILM
Seymour M. Hutchinson, 54—19 Myrtle Ave., Ridgewood, N.Y. 11227, and Franz Krause, 1110 Connetquot Ave., Islip, N.Y. 11751
Filed June 21, 1966, Ser. No. 559,281
4 Claims. (Cl. 34—58)

ABSTRACT OF THE DISCLOSURE

Centrifugal drying apparatus for photographic film, including a frame for holding photographic film, said frame being releasably secured by spring biasing means for rotation in the apparatus.

---

This invention relates to apparatus and accessories for centrifugal drying of various types of photographic film.

The apparatus of the present invention is particularly suitable for use in the dental profession, for example, where diagnosis by X-ray often requires hours for the drying of the film after developing and washing by normal evaporation or heating methods. The purpose of the present invention is to provide an apparatus that will dry the X-ray photographic film rapidly and efficiently by centrifugal means so that the dentist may have the dry film for viewing within a comparatively short time after the X-ray photographs have been taken.

The apparatus of the present invention comprises novel means for accommodating a conventional X-ray film holder upon which are mounted a plurality of single tooth exposures and clamping it upon a rotatable shaft for centrifugally drying of the film. The clamping means are constructed in a manner to counterbalance the film holder on the shaft so as to prevent vibration during the rotation of the assembly. Further means are provided for adjusting the counterbalancing means on the clamp when film holders of different weights are used or where varying amounts of film may be mounted on the film holder, in order to bring about a balanced assembly on the rotating shaft.

In another embodiment of the invention, means are provided for rapidly drying sheet photographic film that contains a panoramic exposure of the whole mouth of the patient. A frame is provided for said sheet photographic film which is replaceably mounted in the apparatus and which also has novel means for stretching the film within the frame. Also, the means for clamping said sheet film are movably mounted on the frame in order to accommodate different lengths of film. Novel means are also provided for releasably mounting the frame in the apparatus.

Still other objects and advantages of the invention will be apparent from the specification. The features of novelty which are believed to be characteristic of the invention are set forth herein and will best be understood, both as to their fundamental principles and as to their particular embodiments, by reference to the specification and accompanying drawings, in which:

FIGURE 1 is an external perspective view of the enclosed apparatus of the present invention;

FIGURE 2 is a somewhat enlarged, exploded view of the apparatus shown in FIGURE 1, the cover thereof being partly broken away to disclose the interior of the enclosure;

FIGURE 3 is a top view of the apparatus shown in FIGURES 1 and 2, a part of the aparatus being removed to show a portion of the drive mechanism;

FIGURE 4 is a greatly enlarged fragmentary section view taken on line 4—4 of FIGURE 3;

FIGURE 5 is a greatly enlarged view of one of the embodiments of the present invention for holding X-ray films of single teeth;

FIGURE 6 is a side view of the film holder shown in FIGURE 5;

FIGURE 7 is a section view taken on line 7—7 of FIGURE 6 with parts broken away and in section;

FIGURE 8 is a fragmentary inverted plan view of the apparatus shown in FIGURE 5;

FIGURE 9 is a greatly enlarged view of another form of film holder and dryer, partly broken intermediate its ends;

FIGURE 10 is a fragmentary side view of the film holder shown taken on line 10—10 of FIGURE 9; and FIGURE 11 is a fragmentary view, partly in elevation, taken on line 11—11 of FIGURE 9.

Referring now to the drawings in detail, there is shown in FIGURES 1 through 4 a film dryer apparatus, generally designated 21, comprising an enclosure having a floor 22 made of sheet metal, upwardly extending integrally formed end walls 23 and 24, said end walls being secured fast to spaced-apart end plates 26 and 27, respectively, which form a stand for said apparatus. Mounted on the outer surface of plate 27 is a case 28 which forms an enclosure for drive motor 29 which is powered by a suitable source of electric current, not shown. Motor 29 is mounted on bracket 31 secured to plate 27 by means of spaced apart posts 32 and 33.

Motor drive shaft 34 extending through bracket 31 terminates in a double pulley 36, said pulley being connected by means of drive belts 37 and 38 with pulleys 39 and 41 mounted on drive shafts 42 and 43, respectively, which rotatably extend through plate 27 and wall 24, into the interior of the apparatus.

The top center portion of each wall 26 and 27 has a downwardly extending recess 44 which removably accommodates the downwardly extending legs 46 at the respective ends of hinge pin 47. Mounted pivotally on hinge pin 47 by means of alternating integrally formed hinges 48 and 49 are two L-shaped cover elements 51 and 52, respectively, which extend in opposite directions over the top of plates 26 and 27, and which terminate in downwardly extending walls 53 and 54, respectively, to form an enclosure for the apparatus. Mounted fast on the center portion of walls 53 and 54 are knobs 56 and 57, respectively, for lifting either of the hinged cover plates 51 and 52, respectively, when access to either interior side of the apparatus is desired.

When necessary or desired, both cover elements 51 and 52 may be lifted off together as a unit from the apparatus with legs 46 emerging from recesses 44 to expose the whole interior space therein which constitutes the centrifuging chamber of the apparatus. Rotatable shaft 42 extends through the centrifuge chamber and is journaled in wall 23 and plate 26. Mounted on shaft 42 is one embodiment of a film holder, generally designated 61, as shown in FIGURES 5, 6, 7 and 8. Said film holder comprises a pair of elongated, spaced apart brackets 62 and 63, each of which are pivotally mounted in parallel array on shaft 42 by means of inwardly extending spaced apart journal hinges 64 and 65, respectively. Each bracket 62 and 63 is somewhat bow-shaped and is enlarged at the center portion intermediate its ends to form a hand grip portion 66 and 67, respectively, along one side of shaft 42. Mounted between hand grip portions 66 and 67 along one side of shaft 42 is a spring element 68 which may be made of a block of resilient rubber, spongy plastic material, or the like. Spring element 68 may also comprise a suitable wire coil or spring blade element which normally urges grips 66 and 67 apart from each other. In one embodiment, as shown in FIGURE 7, spring element 68 in its relaxed condition, permits brackets 62 and 63 normally to be aligned with their opposing surfaces in parallel array.

On the side of shaft 42 opposite to the location of grips 66 and 67, each bracket 62 and 63 has a plurality of integrally formed, spaced apart claw elements 71 and 72, respectively, which extend inwardly a short distance toward each other in pairs. Claws 71 and 72 may be retracted from each other by manually pressing grip portions 66 and 67 together against the action of spring element 68.

Connected by means of screws 73 or the like to the outer ends of grip portions 66 and 67 are gripping plates 74 and 75, respectively, which provide a more advantageous, convenient and effective purchase between the fingers of the operator for urging brackets 62 and 63 pivotally towards each other against the action of spring element 68.

Brackets 62 and 63 are arranged releasably to retain on shaft 42 a conventional dental film holder, generally designated 78, which comprises an elongated, flat stem 79 which is grasped between pairs of claws 71 and 72.

Claws 71 and 72 are initially retracted from each other by urging grip plates 74 and 75 together and pivotally moving brackets 62 and 63. After stem 79 is located between claws 71 and 72, grip plates 74 and 75 are released whereupon said claws move inwardly toward each other under the action of spring element 68 to secure said stem upon shaft 42. One end of stem 79 has a curved hook 81 which enables the film holder to be hung upon a suitable peg, rack, or the like, when not mounted on shaft 42.

Connected to film holder stem 79 are a number of spaced apart pairs of film-holding clamps 82 arrayed on opposite sides of said stem, as shown in FIGURES 5, 6 and 8.

Clamps 82 have spring elements 83 for releasably securing respective photographic X-ray films 84. After films 84 have been exposed in the X-ray apparatus, they are mounted on clamps 82, and stem 79 of film holder 78 is immersed in one or more film developing and washing solutions. Previously, film holder 78 was hung by its hook 81 upon a rack in order to dry the films by evaporation, a process which not only consumed a long time but often resulted in water and other residue spots.

With the apparatus of the present invention, film holder 78 is now applied to shaft 42 in the manner described hereinbefore, motor 29 is started to cause a rotation of said shaft whereby film holder 79 and films 84 are rotated to cause the moisture from said films to be centrifugally removed therefrom in a comparatively short time. By this means the drying of the films is reduced from a matter of hours to a matter of minutes.

It will be noted that the film holder 78 with its stem 79, film clamps 82 and films 84 are arrayed generally on one side of shaft 42. If there were no counterbalancing forces on said shaft while the film holder is being centrifuged, the apparatus would be subjected to excessive vibration that would ultimately damage the apparatus. Accordingly, the bowed portions of brackets 62 and 63 which extend outwardly from shaft 42 and have sufficient weight to provide a counterbalancing weight for film holder 78 whereby the weight is substantially equalized on both sides of shaft 42 so that the latter may rotate without vibration. Alternatively, by providing for replaceable grip plates 74 and 75, sets of said plates of different weights may be available for substitution upon grip portions 66 and 67, respectively, in order to counterbalance substantially the weight of film holder 78 and films 84. Instead of screws 73, other suitable means may be substituted for replaceably mounting grip plates 74 and 75 upon brackets 62 and 63, respectively.

Another embodiment of the invention is shown in FIGURES 9, 10 and 11, wherein drive shaft 43 extends a short distance from wall 24 into the interior of the centrifuge chamber. A short distance from its end, shaft 43 is provided with a rearwardly slanting curved slot 91. This embodiment is intended for drying sheet photographic film 92 as utilized for panoramic full mouth exposures, for example.

The film 92 is suspended within a substantially rectangular frame holder, generally designated 93, having spaced apart end rods 94 and 95 and spaced apart side rods 96 and 97, all of said rods being integrally joined at four corners. Intermediate its ends, rod 95 is removably inserted into slot 91 where it is secured for rotation with shaft 43.

Rod 95 has a pair of bosses 98 spaced apart a slight distance greater than the diameter of shaft 43 for preventing vibration of frame 93 when being rotated by shaft 43.

Rod 94 of frame 93 has intermediate its ends an outwardly extending pin 99 which rotatably extends through an aperture 101 within bracket 102 secured to the interior of wall 23. Mounted in wall 23 and plate 26 is a journal 103 having a central shouldered aperture 104 in which is positioned a captive spring 105 against which the outer end of pivot pin 99 bears. Spring 105 normally urges frame 93 in a direction to cause rod 95 to be urged securely into slot 91 in shaft 43.

Film 92 is supported within frame 93 by means of spaced apart clamps 106, 107 mounted on rod 95 and spaced apart clamps 108, 109 mounted on a transverse rod 111, the latter being movably mounted on side rods 96 and 97. Rod 111 is normally urged yieldably toward rod 94 by means of spaced apart springs 112 connected between these two elements. After film 92 is releasably attached to clamps 106, 107, 108 and 109, springs 112 urging rod 111 toward rod 94 causes film 92 to be maintained in a taut condition within frame 93. Since rod 111 is yieldably mounted on frame 93, sheet film 92 of different lengths may be accommodated in the apparatus.

After film 92 has been exposed and processed in photographic developing and washing baths, it is mounted while still wet on frame 93 in the manner described hereinbefore, after which motor 29 is energized to cause the rotation of shaft 43 which, in turn, rotates frame 93 at centrifugal speeds to cause the removal of moisture from film 92.

While it is possible to mount film 92 within frame 93 and to remove it therefrom while said frame is located within the centrifuge chamber of the apparatus, it is more convenient to remove frame 93 from the apparatus by manually moving the frame toward wall 23 against the action of spring 105 a sufficient distance for rod 95 to be released from slot 91 of shaft 43. Film 92 may be mounted on clamps 106, 107, 108 and 109 after exposure, if desired, and the assembly can then be dipped into developing and washing solutions. The assembly of film 92 on frame 93 can then be mounted in the apparatus by first inserting pin 99 into apertures 101 and 104, and depressing spring 105 therewith until rod 95 is capable of entering slot 91 of shaft 43. Thereafter, frame 93 is released whereby spring 105 urges said frame in a direction whereby rod 95, under suitable guidance, moves into the inner end of slot 91 where it is held captive. Thereafter, the assembly of film 92 and frame 93 is rotated at a suitable speed for removing moisture from said film by centrifugal action, said frame rotating on an axis established by shaft 43 and axially aligned pin 99.

It will be noted that the central portion of bar 95 is engaged within slot 91 of spindle 43 and that pin 99 is mounted on the central portion of rod 94 whereby frame 93 is substantially equally balanced as it rotates so that vibration is substantially obviated. Also, in some embodiments, it is understood that frame 93 may be made in other suitable shapes and transverse rod 111 may be movably mounted alternatively on end rods 94 and 95 with springs 112 urging said transverse rods towards one of the side rods. In such a modification, it will be understood that suitable counterbalancing means would be utilized to centrifugally balance said frame while it is being rotated. It is also to be understood that instead of having pairs of clamps 106, 107 and 108, 109 it may be possible to provide unitary clamps at each end of frame 93 for stretching film 92 therebetween. Also, the two springs 112 may be replaced by a single spring located in a suitable position for urging rod 11 toward rod 94.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Film drying apparatus comprising a case, a power source connected to said case, a shaft in one portion of said case rotatable by said power source, a frame for holding photographic film, one end of said frame being releasably connectable to said shaft, the other end of said frame being releasably and rotatably mounted in another portion of said case, a slot in said shaft, one end portion of said frame being releasably engageable by said slot for rotation of said frame, and a spring element connected between the other end of said frame and said case normally urging said frame into engagement with said slot.

2. Apparatus according to claim 1 and further comprising a pair of spaced apart bosses on said frame, said shaft being located between said bosses in the region of said slot, said bosses being sufficiently close to said shaft for substantially preventing vibration of said frame while it rotates.

3. Apparatus according to claim 1 and further comprising a slot in said shaft, one end portion of said frame being releasably engageable by said slot, a pin on the other end of said frame, a recess in another portion of said case axially aligned with said shaft and removably accommodating said pin and a spring in said recess bearing against said pin normally urging said frame into engagement with said slot.

4. Apparatus according to claim 3 wherein said slot is rearwardly slanted in said shaft.

References Cited

UNITED STATES PATENTS

| | | | |
|---|---|---|---|
| 1,929,283 | 10/1933 | Miller | 95—100 |
| 2,078,078 | 4/1937 | Hood | 95—100 |
| 2,327,100 | 8/1943 | Frey. | |
| 2,883,726 | 4/1959 | Albert | 95—100 XR |
| 3,124,052 | 3/1964 | Elsas | 95—93 XR |

FREDERICK L. MATTESON, JR., *Primary Examiner.*

KENNETH W. SPRAGUE, *Examiner.*

A. D. HERRMANN, *Assistant Examiner.*